United States Patent
Bliss

(10) Patent No.: US 9,166,831 B2
(45) Date of Patent: Oct. 20, 2015

(54) ASYMMETRIC COMPLEXITY PHYS TO REDUCE POWER DISSIPATION IN POINT-TO-POINT COMMUNICATION LINKS

(71) Applicant: Broadcom Corporation, Irvine, CA (US)

(72) Inventor: William Bliss, Granite Canyon, WY (US)

(73) Assignee: Broadcom Corporation, Irvine, CA (US)

( * ) Notice: Subject to any disclaimer, the term of this patent is extended or adjusted under 35 U.S.C. 154(b) by 113 days.

(21) Appl. No.: 13/930,775

(22) Filed: Jun. 28, 2013

(65) Prior Publication Data

US 2015/0003510 A1 Jan. 1, 2015

(51) Int. Cl.
*H03H 7/30* (2006.01)
*H04L 25/03* (2006.01)
*H04L 25/497* (2006.01)

(52) U.S. Cl.
CPC .... *H04L 25/03057* (2013.01); *H04L 25/03343* (2013.01); *H04L 25/4975* (2013.01)

(58) Field of Classification Search
CPC .............. H04L 25/03343; H04L 2025/03414; H04L 1/0026; H04L 2025/03802; H04L 25/025; H04L 2025/03363; H04L 5/1446; H04L 1/0045; H04L 1/0631; H04L 25/4975; H04L 25/03949; H04L 2001/0093; H04L 2025/036

USPC ......... 375/260, 346, 219, 232, 285, 220, 227, 375/233; 455/73, 296; 379/406.08, 406.09; 708/300

See application file for complete search history.

(56) References Cited

U.S. PATENT DOCUMENTS

| | | | | |
|---|---|---|---|---|
| 6,304,134 | B1 * | 10/2001 | Pavan ........................... | 327/552 |
| 2008/0153317 | A1 * | 6/2008 | Hsu et al. ..................... | 439/61 |
| 2012/0284435 | A1 * | 11/2012 | Myrah et al. .................. | 710/74 |

OTHER PUBLICATIONS

Badra et al. "Asymmetric physical layer design for high-speed wireless digital communication",IEEE journal on selected areas in communications;vol. 17 No. 10; Oct. 1999; pp. 1712-1723.*

* cited by examiner

*Primary Examiner* — Rahel Guarino
(74) *Attorney, Agent, or Firm* — Sterne, Kessler, Goldstein & Fox P.L.L.C.

(57) ABSTRACT

An asymmetric PHY pair for communicating over a point-to-point link is disclosed. The PHY pair is asymmetric in that the signal processing power used by one of the PHYs to communicate a unit of data over the link is made to be less than that of the other PHY. This asymmetry is accomplished not merely by reducing the signal processing power of one of the PHYs at the expense of the rate at which symbols can be communicated over the link, but by transferring the signal processing power from one of the PHYs to the other PHY so that the symbol rate can be substantially maintained as compared to the symbol rate of a symmetric PHY pair. The asymmetric PHY pair can be advantageously implemented in many different types of communication systems (i.e., in communication systems where one end is more congested and/or crowded than the other end).

20 Claims, 4 Drawing Sheets

ASYMMETRIC COMPLEXITY PHYS TO REDUCE POWER DISSIPATION IN POINT-TO-POINT COMMUNICATION LINKS

FIELD OF THE INVENTION

This application relates generally to physical layer devices (PHYs) and, more specifically, to asymmetric complexity PHYs for point-to-point communication links.

BACKGROUND

Communication systems are designed to transfer information between two devices over a medium in the presence of disturbing influences. Intersymbol interference (ISI) is one well-known disturbing influence in which transmitted symbols become elongated and interfere with adjacently transmitted symbols. This spreading or "smearing" of symbols is generally caused by the dispersive nature of common communication mediums. Because ISI has the same effect as noise, including a deleterious effect on bit error rate, communication is made less reliable.

One of the most basic solutions for mitigating the effects of ISI is slowing down the speed at which symbols are transmitted over a medium. More specifically, the transmission speed can be slowed down such that a symbol is only transmitted after allowing previously transmitted symbol pulses to dissipate. The time it takes for a symbol pulse to dissipate is called delay spread, whereas the original time of the symbol pulse (including any time before the next symbol pulse is transmitted) is called the symbol time. No ISI will occur if the delay spread is less than or equal to the symbol time.

Although slowing down the symbol rate can reduce or eliminate the effects of ISI and other sources of noise, it is generally an unacceptable solution for many of today's communication applications. In fact, many of today's communication applications require speeds in the multi-gigabit per second range. At such high speeds, ISI can completely overwhelm a signal transmitted over a few inches of printed circuit board trace, a few feet of copper cable, or a few tens of meters of multimode optical fiber.

As a result, additional signal processing components are now commonly found in many of today's communication devices to combat ISI and other sources of noise so that the symbol rate can be maintained at required rates. For example, the physical layer device (PHY) of a communication device communicating over a channel will often include an adaptive decision feedback equalizer (DFE) to perform post-equalization of the channel to reduce ISI, as well as a forward error correction (FEC) encoder/decoder with a high coding gain to further improve the effective signal-to-noise ratio (SNR) of the channel. Although these additional signal processing components can help to reduce the effects of noise, these components are not without cost. For example, these additional components require additional area, power, and ability to dissipate heat. In communication ends that are congested (e.g., that transmit and/or receive large amounts of data) or that are physically crowded, the added area, power, and heat dissipation requirements can be prohibitive.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
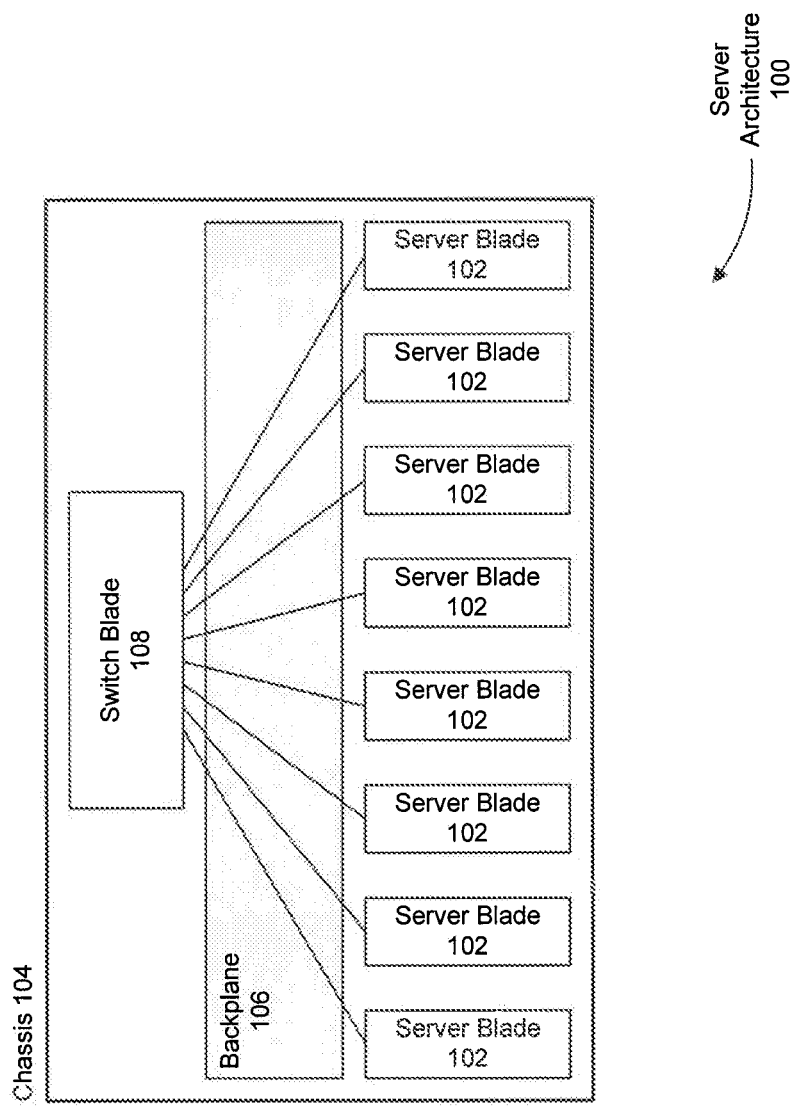
FIG. 1 illustrates an example environment in which embodiments of the present disclosure can be implemented.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

The present disclosure is directed to an asymmetric PHY pair for communicating over a point-to-point link. The PHY pair is asymmetric in that the signal processing power used by one of the PHYs to communicate a unit of data over the link is made to be less than that of the other PHY. This asymmetry is accomplished not merely by reducing the signal processing power of one of the PHYs at the expense of the rate at which symbols can be communicated over the link, but by effectively transferring the signal processing power from one of the PHYs to the other PHY so that the symbol rate can be substantially maintained as compared to the symbol rate of a symmetric PHY pair. The PHY that uses more signal processing power can be referred to as the "hard-end" PHY, and the PHY that uses comparatively less signal processing power can be referred to as the "easy-end" PHY.

The asymmetric PHY pair can be advantageously implemented in many different types of communication systems. For example, the asymmetric PHY pair can be advantageously implemented in a communication system where one end of the communication system transmits and receives comparatively more traffic than the other end. In such a communication system, the PHY that uses less signal processing power (i.e., the "easy-end" PHY) can specifically be located in the end that transmits and receives comparatively more traffic to reduce its overall power and, thereby, heat dissipation requirements, which will typically be more critical than the other end's (i.e., the "hard-end" PHY's) power and heat dissipation requirements. The asymmetric PHY pair can further be advantageously implemented in a communication system where one end of the communication system is comparatively more physically crowded and, thereby, more challenged in dissipating heat than the other end. In such a communication system, the PHY that uses less signal processing power can specifically be located in the crowded end to reduce its overall power and, thereby, heat dissipation requirements, which will typically be more critical than the other end's power and heat dissipation requirements. These and other features of the present disclosure are further described below.

2. EXAMPLE OPERATING ENVIRONMENT

Referring now to FIG. 1, an example operating environment in which embodiments of the present disclosure can be implemented is illustrated. In particular, FIG. 1 illustrates a common server architecture 100 often used to perform one or more of database and application hosting, virtual server hosting, web page serving and caching, SSL encrypting of Web communications, transcoding of web page content for smaller displays, and/or streaming of audio and video content to provide a few examples.

The common server architecture 100 specifically houses a plurality of self-contained server blades 102 in a single chassis 104. The server blades 102 are circuit boards and each typically includes a memory, a central processing unit (CPU), and a hard disk. Within the chassis 104, the server blades 102 are stacked side-by-side and are interconnected over a common backplane 106 using a switch blade 108. Besides providing interconnectivity between the server blades 102, the switch blade 108 can also connect the server blades 102 to an external network (not shown). Many computer networks utilize a switch, such as the switch blade 108, to connect devices together so that frames of data can be forwarded between the devices in an intelligent manner. For example, unlike a hub, a switch does not simply flood an incoming frame received from one device out each of its ports to all other devices. Rather, a switch transmits an incoming frame only out the port connected to the device in which the frame was addressed, assuming such port is known, to reduce unnecessary traffic on the network.

In one embodiment, each of the server blades 102 communicates with the switch blade 108 over two, respective pairs of traces (one pair for a forward channel and one pair for a reverse channel) disposed on the surface of the backplane 106 using, for example, Ethernet. A physical-layer device (PHY) is used at each of the server blades 102 to transmit data to and receive data from a respective PHY at the switch blade 108.

Modern switch blades, such as the switch blade 108, are often challenged by heat dissipation due to the amount of electronics included within them and/or the amount of data that they are required to transmit and receive. For example, the electronics of the single switch blade 108 can be contained in a comparable amount of area as one of the server blades 102, yet be configured to transmit and receive many times the amount of data as one of the server blades 102 and/or include substantially more electronics (e.g., the switch blade 108 is generally required to have a separate PHY for each supported server blade 102, whereas each of the server blades 102 only requires a single PHY).

Because of this comparatively higher amount of data traffic and/or electronics, the switch blade 108 typically produces more heat than any one of the server blades 102 and therefore has a higher heat dissipation requirement. To deal with the higher heat dissipation requirement, the switch blade 108 and its components are typically designed to reduce the amount of heat produced or better dissipate heat at the expense of performance and/or area. For example, the PHYs used by the switch blade 108 to communicate with the server blades 102 are typically integrated on circuit chips referred to as switch chips. Often, however, the features of a single PHY (or more than one or two PHYs) cannot be fully integrated on one of these switch chips due to the amount of power required by the PHYs and resultant heat produced. Therefore, to better dissipate the heat, the features of a PHY are often spread out among multiple different chips on the circuit board of the switch blade 108 at the expense of area, communication speed, and/or number of server blades 102 that can be supported by the switch blade 108.

The asymmetric PHY pair of the present disclosure can help to optimize this tradeoff. The asymmetric PHY pair of the present disclosure can be used to communicate over a point-to-point link, such as the point-to-point link used between one of the server blades 102 and the switch blade 108. The PHY pair is asymmetric in that the signal processing power used by one of the PHYs to communicate a unit of data over the link is made to be less than that of the other PHY. This asymmetry is accomplished not merely by reducing the signal processing power of one of the PHYs at the expense of the rate at which symbols can be communicated over the link, but by effectively transferring the signal processing power from one of the PHYs to the other PHY so that the symbol rate can be substantially maintained as compared to the symbol rate of a symmetric PHY pair.

The asymmetric PHY pair can be advantageously implemented in the example operating environment shown in FIG. 1. For example, the PHY that uses less signal processing power can specifically be located in the switch blade 108 to reduce its overall power and, thereby, heat dissipation requirements, which will typically be more critical than the power and heat dissipation requirements of the other end located in one of the server blades 102.

Although the power and heat produced by the PHY receiving the additional signal processing power will increase, in many communication systems, such as the communication system formed between each of the server blades 102 and the switch blade 108, it is more important to minimize heat produced at one end of the communication system than to minimize the total heat produced by the communication system. The next section below further describes such an asymmetric PHY pair.

3. ASYMMETRIC PHY PAIR

Figure 2:
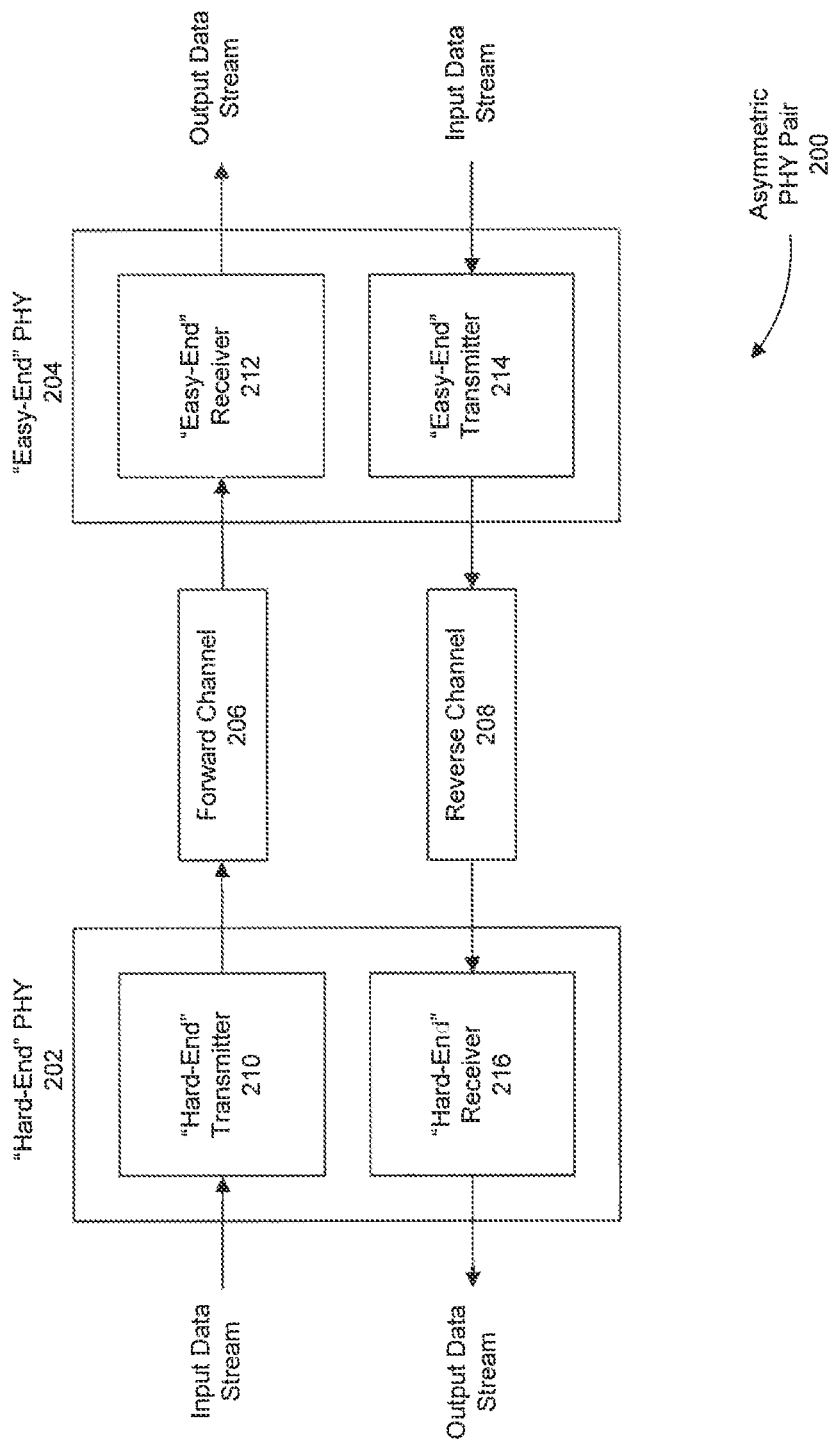
FIG. 2 illustrates a high-level block diagram of an asymmetric PHY pair in accordance with embodiments of the present disclosure.

FIG. 2 illustrates a high-level block diagram of an asymmetric PHY pair 200 for communicating over a point-to-point communication link in accordance with embodiments of the present disclosure. The asymmetric PHY pair 200 includes two ends: a "hard-end" PHY 202 and an "easy-end" PHY 204. The PHY pair 200 is asymmetric in that the signal processing power used by the "easy-end" PHY 204 to communicate a unit of data over the link is made to be less than that of the "hard-end" PHY 202. This asymmetry is accomplished not merely by reducing the signal processing power of the "easy-end" PHY 204 at the expense of the rate at which symbols can be communicated over the link, but by effectively transferring the signal processing power from the "easy-end" PHY 204 to the "hard-end" PHY 202 so that the symbol rate can be substantially maintained as compared to the symbol rate of a symmetric PHY pair.

As shown in FIG. 2, the point-to-point communication link specifically includes a forward channel 206 and a reverse channel 208. The "hard-end" PHY 202 uses a "hard-end" transmitter 210 to transmit data over the forward channel 206 to an "easy-end" receiver 212 included in the "easy-end" PHY 204, and the "easy-end" PHY 204 uses an "easy-end" transmitter 214 to transmit data over the reverse channel 208 to a "hard-end" receiver 216 included in the "hard-end" PHY 202.

Figure 3A:
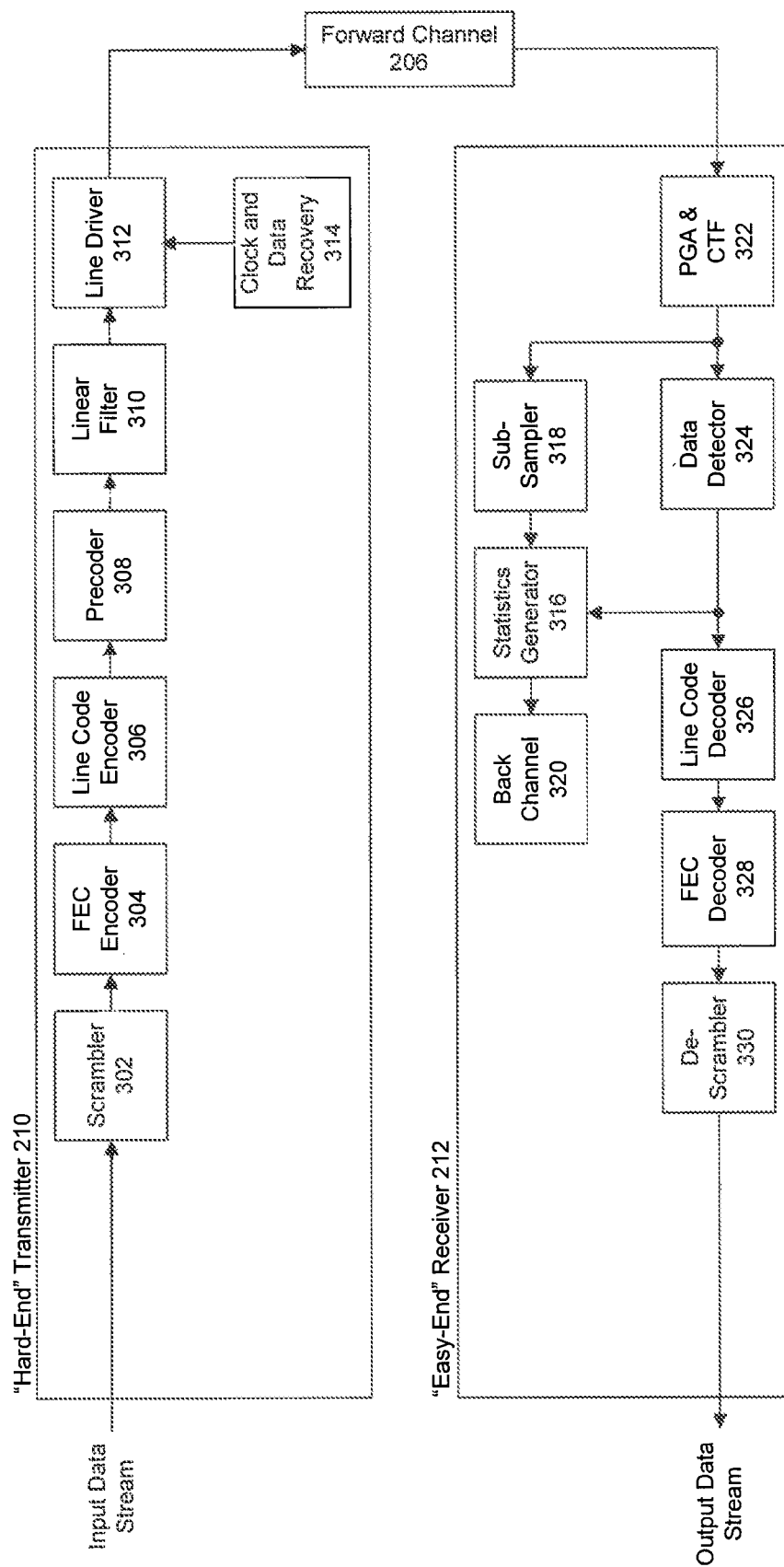
FIG. 3A illustrates an "easy-end" transmitter and a "hard-end" receiver in accordance with embodiments of the present disclosure.

Referring now to FIG. 3A, further details of the "hard-end" transmitter 210 and the "easy-end" receiver 212 are illustrated in accordance with embodiments of the present disclosure. As shown in FIG. 3A, the "hard-end" transmitter 210 includes a scrambler 302, a forward error correction (FEC) encoder 304, a line code encoder 306, a precoder 308, a linear filter 310, a line driver 312, and a clock and data recovery module 314.

In operation, the "hard-end" transmitter 210 receives an input data stream and properly formats the input data stream for transmission over the forward channel 206. The input data stream can include, for example, voice, video, or any other application or program specific data. The input data stream is first received and processed by the scrambler 302. The scrambler 302 can be used to eliminate long sequences of digital '0' or '1' values in the input data stream to provide a scrambled data stream. Eliminating long sequences of digital '0' or '1' values can, for example, help to facilitate the work performed by timing recovery and adaptive circuits at the "easy-end" receiver 212. In one embodiment, the scrambler 302 includes a linear feedback shift register and provides the scrambled data stream as a linear function of the input data stream and a previous state stored in its shift register.

After the input data stream has been scrambled by the scrambler 302, the scrambled data stream is received and processed by the FEC encoder 304 to provide a coding gain. Coding gain is defined as the effective difference in SNR levels between an uncoded system and a coded system. FEC provides a coding gain by introducing redundancy into the scrambled data stream to allow for detection and recovery of transmission errors.

Several specific FEC schemes can be used to encode the scrambled data stream, including, for example, Trellis Coded Modulation (TCM), Low Density Parity Check (LDPC) codes, Turbo Codes, and BCH codes such as Reed-Solomon (RS). In an embodiment, FEC is specifically added to the scrambled data stream using the RS encoding technique. In general, the RS encoding technique appends to each block of k m-ary data symbols, 2t redundancy symbols to create an encoded message block (where t represents the designed symbol error correcting capacity of the code). These 2t symbols, or elements, are selected from the Galois Field to be the roots of an implemented code generator polynomial. There are a total of n=k+2t symbols in an RS encoded message block. The 2t redundant symbols can be used by an RS decoder implemented at the "easy-end" receiver 212 to correct for up to t errors that occur during transmission of the block of k data symbols. In another instance, 2t+1 redundancy symbols are created and appended to each block of k m-ary data symbols, which guarantees that an RS decoder implemented at the "easy-end" receiver 212 can correct all patterns of up to t errors while always detecting and not mis-correcting all patterns of t+1 errors.

To keep the signal processing power of the "easy-end" receiver 212 low, the FEC encoder 304 can implement an RS code with a relatively small error correcting capacity t. In one embodiment, the error correcting capacity t can be reduced to a smaller amount than otherwise would normally be possible because no decision feedback equalizer (DFE) is used in the "easy-end" receiver 212. In general, DFEs are traditionally used in many high-speed receiver designs because of their ability to mitigate ISI. However, DFEs can require a large amount of signal processing power and therefore can be power intensive. Thus, in the spirit of the "easy-end" receiver 212, the traditional DFE has been eliminated from the "easy end" receiver 212 in at least one embodiment and effectively transferred to the "hard-end" transmitter 210 as will be explained further below. As a secondary consequence of this transfer, however, is that the required error correcting capacity t of the FEC encoder 304 can be reduced because the "easy-end" receiver 212 will no longer suffer from well-known error propagation associated with DFEs.

After the scrambled data stream has been encoded by the FEC encoder 304, the FEC encoded data stream is provided to the line code encoder 306. The line code encoder 306 is configured to put the FEC encoded data stream into a form suitable for transmission over the physical channel. This process is often referred to as modulation. In an embodiment, the line code encoder 306 is configured to modulate the symbols of the FEC encoded data stream in accordance with a pulse amplitude modulation (PAM) scheme. For example, and in one embodiment, the line code encoder 306 is configured to modulate the symbols of the FEC encoded data stream using a PAM-2 scheme. However, any reasonable PAM modulation scheme can be used, including PAM-4, PAM-6, and PAM-8, to name a few. In another embodiment, the line code encoder 306 is configured to modulate the symbols of the FEC encoded data stream using a complex modulation scheme, such as quadrature amplitude modulation (QAM) or quadrature phase shift keying (QPSK).

After being modulated by the line code encoder 306, the modulated data stream is passed to the precoder 308. In one embodiment, the precoder 308 implements Tomlinson-Harashima precoding (THP) and is used to precode or, more aptly, pre-equalize the forward channel 206 to mitigate ISI. By pre-equalizing the forward channel 206, the traditionally used DFE at the "easy-end" receiver 212 can be eliminated. Essentially, the feedback and feedforward portions of the DFE have been transferred to the precoder 308.

Although precoders based on THP have been implemented in the past, common implementations of such precoders still relied on a DFE at the receiver to model the channel over which the precoder was intended to pre-equalize. More specifically, coefficients of a DFE would be adapted at the receiver based on symbols received over the channel and then the adapted coefficients of the DFE would be passed back to the precoder at the transmitter to pre-equalize the channel.

The "easy-end" receiver 212 does not include this traditionally used DFE to model the forward channel 206 for the precoder 308 at the "hard-end" transmitter 210. Rather, to keep signal processing low, the "easy-end" receiver 212 implements a statistics generator 316 that implements a less complex algorithm than an adaptive DFE, such as an adaptive least mean squares (LMS) algorithm. The adaptive LMS algorithm can be used to model the forward channel 206 based on known symbols received over the forward channel 206 during, for example, a training mode. To further reduce signal processing at the "easy-end" receiver 212, the adaptive LMS algorithm can be performed using only some of the known symbols transmitted over the forward channel 206 and received by the "easy-end" receiver 212. For example, the signal received over the forward channel 206 containing the known symbols can be sub-sampled by a sub-sampler 318 in the "easy-end" receiver 212 as shown in FIG. 3A.

Once coefficients have been determined by the statistics generator 316 to model the forward channel 206, those coefficients can then be passed back to the precoder 308 at the "hard-end" transmitter 210 using a back channel 320 between the two ends. The back channel 320 can be made transparent to higher levels of the communication protocol used by the "hard-end" transmitter 210 and the "easy-end" receiver 212. For example, in an Ethernet based communication system, the back channel 320 can allow the transmission of some fixed, predetermined number of bits per second from the "easy-end" receiver 212 to the "hard-end" transmitter 210, and Ethernet MACs implemented at each of these two ends would have no knowledge of these transmissions. The back channel 320 does not need a separate physical channel, but can simply use some of the bits of the forward channel 206.

In another embodiment, the "hard-end" transmitter 210 can implement an adaptive DFE or perform an adaptive LMS algorithm to model the reverse channel 208. While not perfect, the coefficients determined using this method can be used as an initial starting point by the precoder 308 to pre-equalize the forward channel 206.

After being precoded by the precoder 308, the precoded data stream is passed to the linear filter 310. In general, high speed signals transmitted over some types of channels, such as traces on a printed circuit board, tend to suffer from high-frequency attenuation that makes reliable detection of the transmitted data at a receiver more difficult. The overall effect is similar to a low pass filter which decreases high-frequency signal gain. Dielectric loss, skin effect, and crosstalk are typical culprits of this low pass filter effect.

In one embodiment, the linear filter 310 is configured to boost high frequency components of the precoded data stream, while not affecting its low frequency components. In another embodiment, the linear filter 310 is configured to suppress the low frequency components of the precoded data stream, while not affecting its high frequency components. The linear filter 310 can further be implemented to help limit a required dynamic range in the "easy-end" receiver 212.

After undergoing filtering by the linear filter 310, the filtered data stream is passed to the line driver 312. The line driver 312 amplifies the filtered data before driving the filtered data over the forward channel 206. In one embodiment, the line driver 312 provides a higher-level of amplification than a similar line driver implemented in the "easy-end" transmitter 214 shown in FIG. 2.

One other module not yet discussed that is included in the "hard-end" transmitter 210 is the clock and data recovery module 314. The clock and data recovery module 314 is configured to recover a clock from data received from the "easy-end" transmitter 214, which is co-located with the "easy-end" receiver 212 as shown in FIG. 2. The "easy-end" transmitter 214 can transmit data using a clock generated by a local, free-running crystal oscillator. The generated clock can be suitable scaled by a phase locked loop. By having the "hard-end" transmitter 210 recover this clock and use it to transmit data, the same clock used by the "easy-end" transmitter 214 can also then be used by the co-located "easy-end" receiver 212 to properly sample the data received from the "hard-end" transmitter 210. Because the "easy-end" receiver 212 can use the locally generated clock suitably scaled using, for example, a PLL to sample the data received from the "hard-end" transmitter 210 and does not need to recover a clock to do so, the signal processing requirements at the "easy-end" receiver 212 are further reduced. In one embodiment, the "easy-end" receiver 212 can further provide commands to the "hard-end" transmitter 210 to increment or decrement the absolute phase of the recovered clock it uses to transmit data to the "easy-end" receiver 212. In this way, the "easy-end" receiver 212 can achieve a close to optimal sampling phase for a baud rate system without any clock recover or fin clock phase adjustment at the "easy-end" receiver 212. The "easy-end" receiver 212 can provide these commands over the back channel 320, for example.

After a modulated data stream is transmitted by the "hard-end" transmitter 210 over the forward channel 206, it is received and processed by the "easy-end" receiver 212. The "easy-end" receiver 212 is configured to manipulate the modulated data stream it receives from the "hard-end" transmitter 210 to properly recover an output data stream. The output data stream can include voice, video, or any other application or program specific data.

Besides the components already mentioned above, the "easy-end" receiver 212 specifically includes a programmable gain amplifier and continuous time filter 322, a data detector 324, a line code decoder 326, a FEC decoder 328, and a de-scrambler 330. The modulated data stream received from the "hard-end" transmitter 210 is first processed by the programmable gain amplifier and continuous time filter 322. The programmable gain amplifier and continuous time filter 322 can be used to amplify the modulated data stream. Because the forward channel 206 from which the modulated data stream is received can vary greatly in terms of the attenuation it provides to the modulated data during transmission, the programmable gain amplifier and continuous time filter 322 can be made programmable such that the "easy-end" receiver 312 can adjust to different channel conditions such as length, for example. The programmable gain amplifier and continuous time filter 322 can further be used to suppress excess thermal noise and other high frequency noise sources (e.g., any electro-magnetic emissions) in the modulated data stream and/or to boost mid to high frequency components of the modulated data stream.

After amplifying and/or filtering, the modulated data stream is provided to the data detector 324. In typical high-speed receivers, such as the "easy-end" receiver 212, the data detector 324 would include a DFE to post-equalize the forward channel 206 to mitigate ISI. However, as noted above, the functionality of the commonly used DFE has been effectively transferred to the "hard-end" transmitter 210 and implemented as a THP using the precoder 308. Because of this, the data detector 324 can be implemented as a simple PAM-M slicer, where M can be any reasonable integer value consistent with the PAM modulation used at the "hard-end" transmitter 210. The PAM-M slicer is extended depending on the range of the THP coefficients used by the precoder 308 at the "hard-end" transmitter 210.

After being processed by the data detector 324, the modulated data stream is received and processed by the line code decoder 326. In general, the line code decoder 326 is configured to demodulate the symbols of the modulated data stream. For example, assuming the symbols represent PAM-4 data, the line code decoder 326 is configured to demodulate each symbol into its corresponding two-bit value.

The demodulated bit-stream is subsequently received and processed by the FEC decoder 328. In general, the FEC decoder 328 is configured to detect and recover transmission errors in the demodulated bit-stream and can be configured to operate in accordance with any one of a number of different FEC schemes, including, for example, Trellis Coded Modulation (TCM), Low Density Parity Check (LDPC) codes, and BCH codes such as Reed-Solomon (RS) consistent with the FEC encoder used at the "hard-end" transmitter 210.

Finally, after being processed by the FEC decoder 328, the error corrected bit-stream is received and processed by the de-scrambler 330, which can be used to perform the inverse of any scrambling function performed at the "hard-end" transmitter 210. The de-scrambled data is then provided as the recovered output data stream.

It should be noted that some of the features shown in FIG. 3A are optionally included and are described above as being included in the "hard-end" transmitter 216 or the "easy-end" receiver 210 by way of example and not limitation.

Figure 3B:
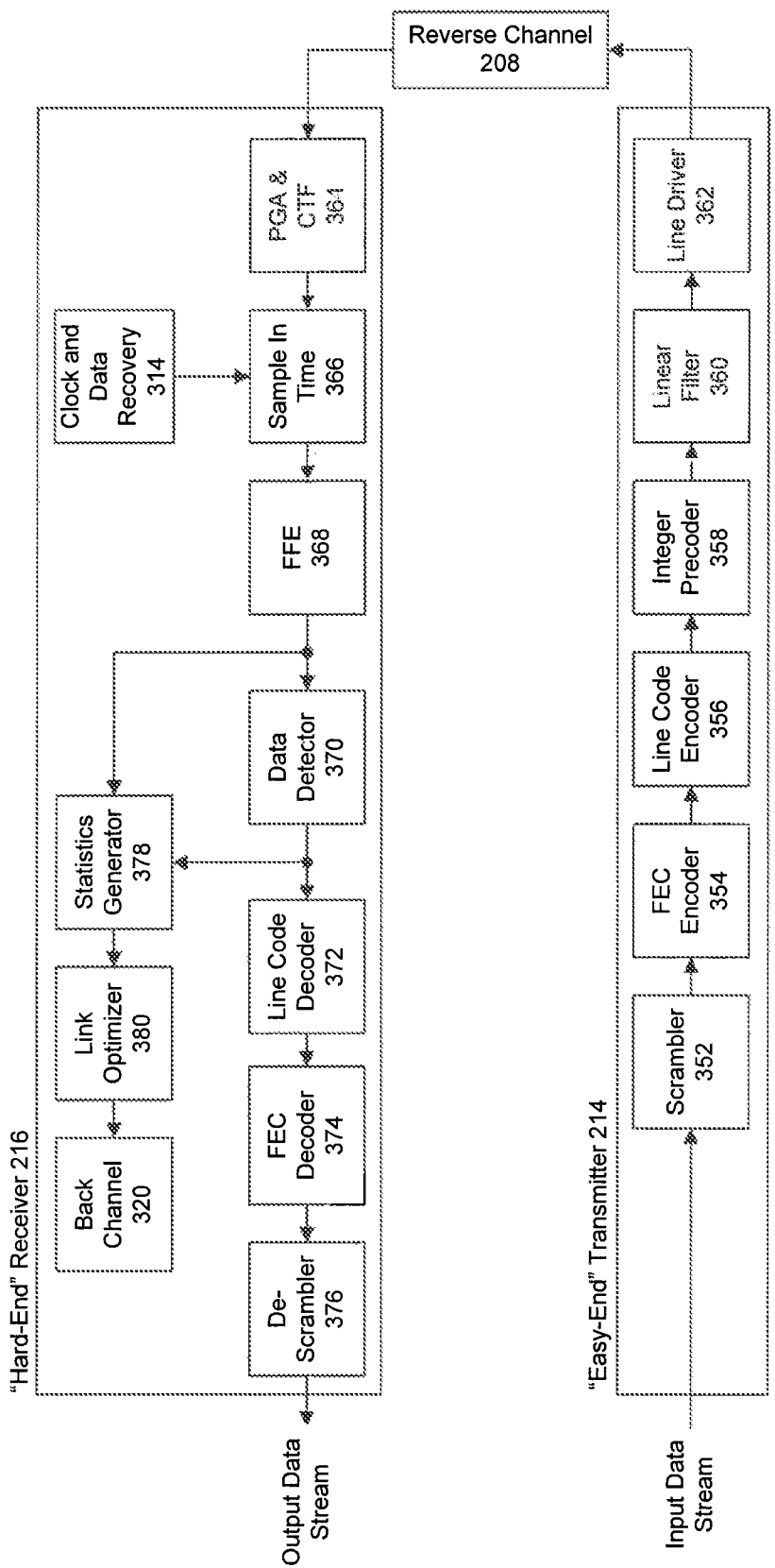
FIG. 3B illustrates a "hard-end" transmitter and an "easy-end" receiver in accordance with embodiments of the present disclosure.

Referring now to FIG. 3B, further details of the "easy-end" transmitter 214 and the "hard-end" receiver 216 are illustrated in accordance with embodiments of the present disclosure. As shown in FIG. 3A, the "easy-end" transmitter 214 includes a scrambler 352, a forward error correction (FEC) encoder 354, a line code encoder 356, an integer precoder 358, a linear filter 360, and a line driver 362.

In operation, the "easy-end" transmitter 214 receives an input data stream and properly formats the input data stream for transmission over the reverse channel 208. The input data stream can include, for example, voice, video, or any other application or program specific data. The input data stream is first received and processed by the scrambler 352. The scrambler 352 can be used to eliminate long sequences of digital '0' or '1' values in the input data stream to provide a scrambled data stream. Eliminating long sequences of digital '0' or '1' values can, for example, help to facilitate the work performed by timing recovery and adaptive circuits at the "hard-end" receiver 216. In one embodiment, the scrambler 352 includes a linear feedback shift register and provides the scrambled data stream as a linear function of the input data stream and a previous state stored in its shift register.

After the input data stream has been scrambled by the scrambler 352, the scrambled data stream is received and processed by the FEC encoder 354 to provide a coding gain. Several specific FEC schemes can be used to encode the scrambled data stream, including, for example, Trellis Coded Modulation (TCM), Low Density Parity Check (LDPC) codes, Turbo Codes, and BCH codes such as Reed-Solomon (RS). In an embodiment, FEC is specifically added to the scrambled data stream using the RS encoding technique.

After the scrambled data stream has been encoded by the FEC encoder 354, the FEC encoded data stream is provided to the line code encoder 356. The line code encoder 356 is configured to put the FEC encoded data stream into a form suitable for transmission over the physical channel. This process is often referred to as modulation. In an embodiment, the line code encoder 356 is configured to modulate the symbols of the FEC encoded data stream in accordance with a PAM scheme. For example, and in one embodiment, the line code encoder 356 is configured to modulate the symbols of the FEC encoded data stream using a PAM-2 scheme. However, any PAM modulation scheme can be used, including PAM-4, PAM-6, and PAM-8, to name a few. In another embodiment, the line code encoder 356 is configured to modulate the symbols of the FEC encoded data stream using a complex modulation scheme, such as quadrature amplitude modulation (QAM) or quadrature phase shift keying (QPSK).

After being modulated by the line code encoder 356, the modulated data stream is passed to the integer precoder 358. In one embodiment, the integer precoder 358 is configured to perform partial response precoding of the modulated data stream to pre-equalize the reverse channel 208. Partial response precoding is comparatively simpler in terms of area, signal processing, and power requirements than THP performed by the "hard-end" transmitter 210 as described above.

After being precoded by the integer precoder 358, the precoded data stream is passed to the linear filter 360. As noted above, high speed signals transmitted over some types of channels, such as traces on a printed circuit board, tend to suffer from high-frequency attenuation that makes reliable detection of the transmitted data at a receiver more difficult. The overall effect is similar to a low pass filter which decreases high-frequency signal gain. Dielectric loss, skin effect, and crosstalk are typical culprits of this low pass filter effect.

In one embodiment, the linear filter 360 is configured to boost high frequency components of the precoded data stream, while not affecting its low frequency components. In another embodiment, the linear filter 360 is configured to suppress the low frequency components of the precoded data stream, while not affecting its high frequency components. In yet another embodiment, the linear filter 360 is omitted from the "easy-end" transmitter 214 to further reduce the amount of signal processing it performs and, thereby, its power dissipation. In general, the functionality performed by the linear filter 360 can be performed at the "hard-end" receiver 216 as will be explained further below.

After undergoing filtering by the linear filter 360, the filtered data stream is passed to the line driver 362. The line driver 362 amplifies the filtered data before driving the filtered data over the reverse channel 208. In one embodiment, the line driver 362 provides a level of amplification at or near the lowest possible amount possible given conditions of the reverse channel 208 and a required, effective transmission rate.

After a modulated data stream is transmitted by the "easy-end" transmitter 214 over the reverse channel 208, it is received and processed by the "hard-end" receiver 216. The "hard-end" receiver 216 is configured to manipulate the modulated data stream it receives from the "easy-end" transmitter 214 to properly recover an output data stream. The output data stream can include voice, video, or any other application or program specific data.

The "hard-end" receiver 216 specifically includes a programmable gain amplifier and continuous time filter 364, a sample in time module 366, a feed forward equalizer (FFE) 368, a data detector 370, a line code decoder 372, a FEC decoder 374, and a de-scrambler 376. The modulated data stream received from the "easy-end" receiver 214 is first processed by the programmable gain amplifier and continuous time filter 364. The programmable gain amplifier and continuous time filter 364 can be used to amplify the modulated data stream. Because the reverse channel 208 from which the modulated data stream is received can vary greatly in terms of the attenuation it provides to the data during transmission, the programmable gain amplifier and continuous time filter 364 can be made programmable such that the "hard-end" receiver 216 can adjust to different channel conditions such as length, for example. The programmable gain amplifier and continuous time filter 364 can further be used to suppress excess thermal noise and other high frequency noise sources (e.g., any electro-magnetic emissions) in the modulated data stream and/or to boost mid to high frequency components of the modulated data stream.

The modulated data stream after being amplified and filtered by the programmable gain amplifier and continuous time filter 364 is received and processed by the discrete time sampler 366. In general, discrete time sampler 366 is configured to sample the modulated data stream in time and provide discrete samples at its output. In one embodiment, the discrete time sampler 366 is an analog-to-digital converter (ADC) that not only samples in time, but also quantizes in amplitude the modulated data stream. It should be noted that the discrete time sample 366 is configured to sample the modulated data stream in accordance with the clock recovered by the clock and data recovery module 314, which was described above in regard to FIG. 3A. The clock recovered by the clock and data recover module 314 and used to sample the modulated data is specifically recovered from the data transmitted by the "easy-end" transmitter 214.

After being sampled, the samples of the modulated data stream are received and processed by the FFE 368. The FFE 368, in one embodiment, is implemented as a parallel FFE and is configured to reduce the negative influence of precursor ISI on a data symbol received over the reverse channel 208. Specifically, the FFE 368 is configured to delay a data symbol by one or more symbol periods so that an appropriately weighted combination of future symbols that interfere with the current symbol can be used to compensate for precursor ISI. In another embodiment, the FFE 368 is configured to reduce precursor and/or postcusor ISI on a data symbol received over the reverse channel 208. In yet another embodiment, the FFE 368 is configured to put the ISI and noise into a relationship optimal for the data detector 370, which in one embodiment is an adaptive DFE.

In general, in a non-parallel FFE implementation, a series of delay elements and taps are used to compensate for the precursor contribution of one or more future symbols on a current symbol. The future symbols are stored in and tapped from the series of delay elements. The tapped values are then multiplied by respective tap weights that are related to the extent of precursor ISI contributed by the future symbols. The resulting products are then subtracted from the current symbol being processed to substantially eliminate precursor ISI. In an embodiment, the tap weights are determined by an adaptation engine (not shown) and can be continually adapted by the adaptation engine to change with the conditions of the channel over which the data is received.

It should be noted that the FFE 368 is optionally included in the "hard-end" receiver 216. For example, in other embodiments, the FFE 368 can be omitted and its function can be performed by a combination of other linear filters.

After processing by the FFE 368, the modulated data stream is provided to the data detector 370. In at least one embodiment, the data detector 370 includes a DFE (or an alternative to a DFE, such as MLSD, Viterbi detector, etc.) and an apparatus for performing an inverse of the simple partial response precoding performed by the integer precoder 358 at the "easy-end" transmitter 214.

After being processed by the data detector 370, the modulated data stream is received and processed by the line code decoder 372. In general, the line code decoder 370 is configured to demodulate the symbols of the modulated data stream. For example, assuming the symbols represent PAM-4 data, the line code decoder 370 is configured to demodulate each symbol into its corresponding two-bit value.

The demodulated bit-stream is subsequently received and processed by the FEC decoder 374. In general, the FEC decoder 374 is configured to detect and recover transmission errors in the demodulated bit-stream and can be configured to operate in accordance with any one of a number of different FEC schemes, including, for example, Trellis Coded Modulation (TCM), Low Density Parity Check (LDPC) codes, and BCH codes such as Reed-Solomon (RS).

Finally, after being processed by the FEC decoder 374, the error corrected bit-stream is received and processed by the de-scrambler 376, which can be used to perform the inverse of any scrambling function performed at the "easy-end" transmitter 214. The de-scrambled data is then provided as the recovered output data stream.

It should be noted that a statistics generator 378 and link optimizer 380 can be further implemented in the "hard-end" receiver 216 to analyze received data and to generate adjustment parameters for modules at the "easy-end" transmitter 214. For example, the adjustment parameters can be used to adjust the following modules at the "easy-end" transmitter 214: line driver 362, the linear filter 360, or the integer precoder 358. The adjustment parameters can be transmitted over the back channel 320, described above, to the "easy-end" transmitter 214.

It should be further noted that some of the features shown in FIG. 3B are optionally included and are described above as being included in the "easy-end" transmitter 214 or the "hard-end" receiver 214 by way of example and not limitation.

4. CONCLUSION

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A hard-end physical layer device (PHY) comprising:
a hard-end transmitter configured to pre-equalize a forward channel and transmit first data over the forward channel to an easy-end receiver, wherein the hard-end transmitter is configured to pre-equalize the forward channel based on an estimate of characteristics of the forward channel determined without aid from a decision feedback equalizer at the easy-end receiver;
a hard-end receiver configured to post-equalize a reverse channel and receive second data over the reverse channel from an easy-end transmitter; and
a clock data recovery module configured to recover a clock from data received from a transmitter of an easy-end PHY, wherein the hard-end transmitter is configured to transmit the first data in accordance with the recovered clock, and wherein the hard-end receiver is configured to receive the second data in accordance with the recovered clock.

2. The hard-end PHY of claim 1, wherein the hard-end transmitter comprises a Tomlinson-Harashima precoder configured to pre-equalize the forward channel.

3. The hard-end PHY of claim 2, wherein the hard-end transmitter is configured to determine initial tap coefficients for the Tomlinson-Harashima precoder based on an estimate of characteristics of the reverse channel determined at the hard-end PHY.

4. The hard-end PHY of claim 2, wherein the hard-end transmitter is configured to determine tap coefficients for the Tomlinson-Harashima precoder based on the estimate of characteristics of the forward channel determined using an adaptive least mean squares algorithm at the easy-end receiver.

5. The hard-end PHY of claim 4, wherein the adaptive least mean squares algorithm uses known symbols obtained by sub-sampling a signal received over the forward channel from the hard-end transmitter.

6. The hard-end PHY of claim 1, wherein the hard-end receiver comprises a decision feedback equalizer configured to post-equalize the forward channel.

7. The hard-end PHY of claim 1, wherein the hard-end receiver comprises a continuous time filter configured to boost high frequency signal components of the second data.

8. The hard-end PHY of claim 1, wherein the hard-end PHY is implemented in a non-switch network device and the easy-end PHY is implemented in a network switch.

9. The hard-end PHY of claim 1, wherein the hard-end PHY is implemented in a server blade, the easy-end PHY is implemented in a switch blade, and the forward and reverse channels are implemented on a backplane.

10. A hard-end physical layer device (PHY) comprising:
a hard-end transmitter configured to pre-equalize a forward channel and transmit first data over the forward channel to an easy-end receiver, wherein the hard-end transmitter is configured to pre-equalize the forward channel based on an estimate of characteristics of the forward channel determined using an adaptive least mean squares algorithm at the easy-end receiver;
a hard-end receiver configured to post-equalize a reverse channel and receive second data over the reverse channel from an easy-end transmitter; and
a clock data recovery module configured to recover a clock from data received from the transmitter of the easy-end PHY, wherein the hard-end transmitter is configured to transmit the first data in accordance with the recovered clock, and wherein the hard-end receiver is configured to receive the second data in accordance with the recovered clock.

11. The hard-end PHY of claim 10, wherein the hard-end transmitter comprises a Tomlinson-Harashima precoder configured to pre-equalize the forward channel.

12. The hard-end PHY of claim 11, wherein the hard-end transmitter is configured to determine initial tap coefficients for the Tomlinson-Harashima precoder based on an estimate of characteristics of the reverse channel determined at the hard-end PRY.

13. The hard-end PHY of claim 11, wherein the hard-end transmitter is configured to determine tap coefficients for the Tomlinson-Harashima precoder based on the estimate of characteristics of the forward channel determined at the easy-end receiver.

14. The hard-end PHY of claim 10, wherein the adaptive least mean squares algorithm uses known symbols obtained by sub-sampling a signal received over the forward channel from the hard-end transmitter.

15. The hard-end PHY of claim 10, wherein the hard-end receiver comprises a decision feedback equalizer configured to post-equalize the forward channel.

16. The hard-end PHY of claim 10, wherein the hard-end receiver comprises a continuous time filter configured to boost high frequency signal components of the second data.

17. The hard-end PHY of claim 10, wherein the hard-end PHY is implemented in a non-switch network device and the easy-end PHY is implemented in a network switch.

18. A hard-end physical layer device (PHY) implemented in a server blade comprising:
a hard-end transmitter configured to pre-equalize a forward channel on a backplane and transmit first data over the forward channel to an easy-end receiver implemented in a switch blade;
a hard-end receiver configured to post-equalize a reverse channel on the backplane and receive second data over the reverse channel from an easy-end transmitter implemented in the switch blade; and
a clock data recovery module configured to recover a clock from data received from a transmitter of an easy-end PHY, wherein the hard-end transmitter is configured to transmit the first data in accordance with the recovered clock, and wherein the hard-end receiver is configured to receive the second data in accordance with the recovered clock.

19. The hard-end PHY of claim 18, wherein the hard-end transmitter comprises a Tomlinson-Harashima precoder configured to pre-equalize the forward channel.

20. The hard-end PHY of claim 19, wherein the hard-end transmitter is configured to determine initial tap coefficients for the Tomlinson-Harashima precoder based on an estimate of characteristics of the reverse channel determined at the hard-end PHY.

* * * * *

UNITED STATES PATENT AND TRADEMARK OFFICE
CERTIFICATE OF CORRECTION

PATENT NO. : 9,166,831 B2  Page 1 of 1
APPLICATION NO. : 13/930775
DATED : October 20, 2015
INVENTOR(S) : William Bliss It is certified that error appears in the above-identified patent and that said Letters Patent is hereby corrected as shown below:

IN THE CLAIMS

Column 13, line 44, please replace "hard-end PRY." with --hard-end PHY--.

Signed and Sealed this
Twenty-ninth Day of March, 2016

Michelle K. Lee
*Director of the United States Patent and Trademark Office*